Oct. 18, 1927.    1,646,367

F. S. CARR

NUT AND SCREW FASTENING

Filed July 22, 1925

Inventor:
Fred S. Carr,
by Emery Booth Janney + Varney
Attys.

Patented Oct. 18, 1927.

1,646,367

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

NUT AND SCREW FASTENING.

Application filed July 22, 1925. Serial No. 45,280.

This invention aims to provide an improved lock nut fastening installation.

In the drawings which illustrate preferred embodiments of my invention.

Figure 1:
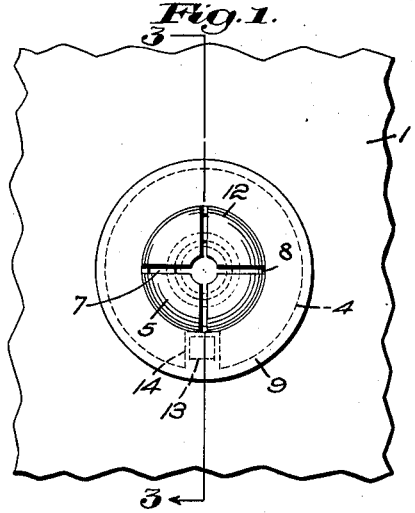
Fig. 1 is an elevation view of the completed installation as viewed from the inside of the nut supporting part.

Referring to the drawings, I have illustrated nut and screw fastening means which are particularly, though not exclusively, useful for securing sheet metal parts together. The fastening means shown are particularly adapted for use in automobile body construction to secure fixtures, such as hinges, sheet metal parts, finishing strips and the like, to automobiles.

In Figs. 1 through 5 I have illustrated a sheet metal nut supporting part 1 having an aperture 2 extending therethrough for receiving a nut member 3. The nut member is substantially stud-like in contour having a base portion 4, a head 5, and relatively long tapered neck 6. The head and neck are divided by a plurality of slits 7 which extend from the end of the head to the base 4 thereby to permit contraction and expansion of the head and neck. The nut is also provided with a tapered screw threaded hole 8 extending through the axis thereof. The taper to the hole 8 is formed by bumping the head 5 in the same manner as more fully illustrated in my copending application Serial No. 45,263 filed herewith.

The remainder of the installation includes a dish-shaped washer 9, a screw 10, and a part 11 to be held in place by the screw.

Figure 2:
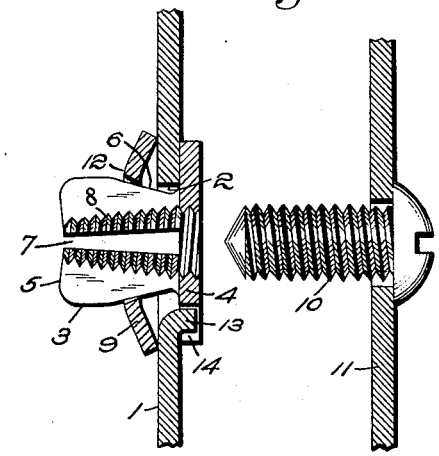
Fig. 2 is a section of the parts of the installation before securing the screw to the nut.
Figure 4:
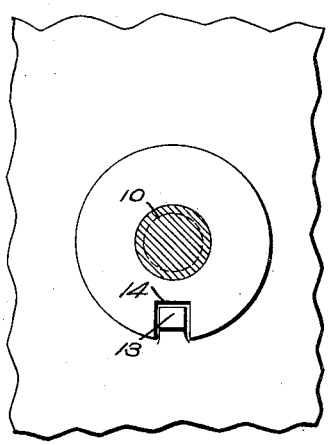
Fig. 4 is a section on the line 4—4 of Fig. 3, showing the means for preventing rotation of the nut relative to its support.

In assembling the installation the head and neck portions of the nut are entered through the aperture 2 in the support 1, the aperture being slightly larger in diameter than the diameter of the head 5. Then the washer 9 is snapped over the head of the nut to hold it in assembly with the support as illustrated in Fig. 2. Thus the base 4 of the nut seats against the outer face of the support 1 and the rim of the washer 9 rests against the inner face of the support while the wall 12 surrounding the aperture in the washer engages the neck 6 of the nut at a point remote from the inner face of the support for purposes more fully hereinafter described. To prevent turning of the nut relative to the support 1, I have provided a tongue 13 formed from the part 1 at the edge of the aperture 2, for engagement in a slot 14 provided in the base of the nut as illustrated in Figs. 2 and 4.

Figure 3:
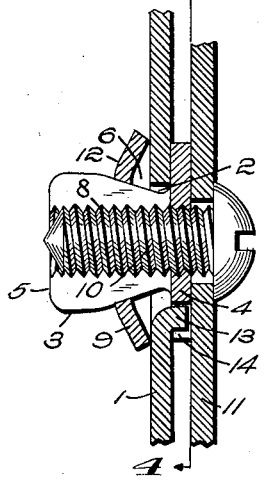
Fig. 3 is a section on the line 3—3 of Fig. 1.

After the nut has been assembled with the support 1, as illustrated in Fig. 2, the screw 10 which passes through the part 11 may be entered in the threaded hole 8 in the nut and turned until the part 11 is seated tightly against the base 4 of the nut as shown in Fig. 3. During the screwing together operation, the screw expands the head and neck portions of the nut so that the neck grips the wall surrounding the aperture through the washer 9. The wall 12 is spaced away from the inner face of the support so as to be located in a position relative to the neck 6 of the nut where substantial expansion takes place during the expanding operation by the screw 10. Thus the nut is held tightly against the wall 14 and back supported by the screw so as to lock the nut to the support 1 to prevent separation therefrom when strain is exerted upon the part 11.

Figure 5:
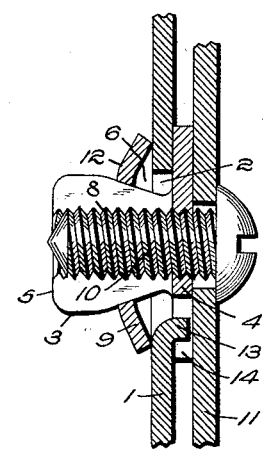
Fig. 5 is a section of another form of installation showing a relatively large aperture through the nut support to permit transverse shifting of the nut.
Figure 6:
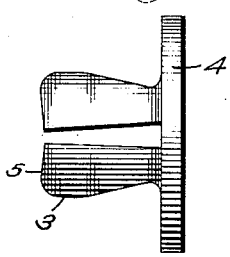
Fig. 6 is a side elevation of the nut shown in Fig. 7.
Figure 7:
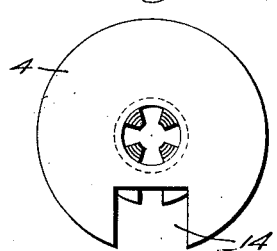
Fig. 7 is a front elevation of the same nut.

In Figs. 5 through 7 I have illustrated a shiftable nut fastening installation which includes substantially the same parts as illustrated and described in connection with the first form of installation. In this instance however I have provided for shifting the nut transversely relatively to its support for alignment with the screw.

As illustrated in Fig. 5, the aperture 2 in the part 1 is relatively large enough to permit transverse movement of the nut in any direction relative to the support 1. The only other change necessary to provide shiftability is to form a relatively longer and wider slot 14 in the base 4 of the nut (Fig. 7) than the slot indicated in Fig. 4 thereby permitting the nut to shift transversely relative to the tongue 13 while preventing substantial turning movement of the nut relative to the support 1.

While I have shown and described preferred embodiments of my invention, it will be understood that changes involving omission, substitution, alteration and reversal of parts and even changes in the mode of operation may be made without departing from the scope of my invention which is best defined in the appended claims.

I claim—

1. A nut fastening installation comprising, in combination, a nut supporting part, a stud-like nut having a head, a neck and a base, said head and neck being contractible and expansible and passing through an aperture in said support, said base seated against one face of the support and a washer snapped over the head of the nut to be resiliently engaged by the neck thereof, said washer seated against the opposite face of said support from that face against which said base is seated thereby to secure said nut to said support.

2. A nut fastening installation comprising, in combination, a nut supporting part, a nut having a base portion seated against one face of the support and a resilient portion passing through an aperture in said support and a washer snapped over said resilient portion to hold said nut in assembly with said nut supporting part.

3. A nut fastening installation comprising, in combination, a nut supporting part, a nut having a base portion seated against one face of the support and a resilient portion passing through an aperture in said support, interlocking means for preventing relative rotation between the nut and nut support and a dish-shaped washer snapped over said resilient portion to hold said nut in assembly with said supporting part.

4. A nut fastening installation comprising, in combination, a nut supporting part, a nut having a head, a neck and a base portion, said nut being split from the outer end of the head to the base to permit contraction and expansion of said head, a screw threaded hole extending through said nut, said head and neck portion extending through an aperture in said support and a dish-shaped washer snapped over said head to hold said nut in assembly with said nut supporting part.

5. A nut fastening installation comprising, in combination, a nut supporting part having an aperture therethrough, a nut having a resilient portion passing through said aperture, a washer snapped over said resilient part from the back side of said support, a normally tapered threaded hole extending through the axis of said nut and a screw for threaded engagement in said hole to expand said resilient part tightly against said washer thereby to lock said nut to said support and secure a part thereto.

6. A nut fastening installation comprising, in combination, a nut supporting part, a nut having a head and neck portion passing through an aperture in said support, the aperture being relatively larger in diameter than the head of the nut to permit transverse shifting movement of the nut relative to the support, means for preventing substantial turning movement of the nut relative to the support, and a washer resiliently secured to the neck of the nut to hold said nut in assembly with said support while permitting said transverse shifting movement to take place.

7. A nut fastening installation including a support having an aperture therethrough, a nut having a base portion seated against the outer face of said support, and a contractible and expansible portion passing loosely through said aperture, interengaging means between the base of the nut and the support to prevent substantial turning movement of the nut relative to the support and a dish-shaped washer snapped into engagement with said contractible and expansible portion from the back of said support to hold said nut in assembly therewith while permitting transverse movement of said nut relative to said support.

8. A nut fastening installation including a support having an aperture therethrough, a nut having a base portion seated against the outer face of said support, and a contractible and expansible portion passing loosely through said aperture, interengaging means between the base of the nut and the support to prevent substantial turning movement of the nut relative to the support and a dish-shaped washer snapped into engagement with said contractible and expansible portion from the back of said support to hold said nut in assembly therewith while permitting transverse movement of said nut relative to said support, a tapered hole extending through the axis of said nut and means for engagement in said hole to expand said contractible and expansible portions against said washer thereby to lock said nut with said support and secure a part thereto.

In testimony whereof, I have signed my name to this specification.

FRED S. CARR.